United States Patent
Can Saraclar et al.

(10) Patent No.: US 12,342,840 B2
(45) Date of Patent: Jul. 1, 2025

(54) COMPOSITION SUITABLE FOR THE REPLACEMENT OF GLUCOSE-SYRUP

(71) Applicant: CARGILL, INCORPORATED, Wayzata, MN (US)

(72) Inventors: Yamam Can Saraclar, Atasehir (TR); Burçak Taskin, Atasehir (TR)

(73) Assignee: Cargill, Incorporated, Wayzata, MN (US)

( * ) Notice: Subject to any disclaimer, the term of this patent is extended or adjusted under 35 U.S.C. 154(b) by 569 days.

(21) Appl. No.: 17/753,431

(22) PCT Filed: Sep. 4, 2020

(86) PCT No.: PCT/US2020/049515
§ 371 (c)(1),
(2) Date: Mar. 2, 2022

(87) PCT Pub. No.: WO2021/046427
PCT Pub. Date: Mar. 11, 2021

(65) Prior Publication Data
US 2022/0330589 A1 Oct. 20, 2022

(30) Foreign Application Priority Data

Sep. 6, 2019 (EP) .................... 19196009
Oct. 25, 2019 (EP) .................... 19205249

(51) Int. Cl.
*A23L 27/30* (2016.01)
*A21D 13/00* (2017.01)
*A23G 9/00* (2006.01)

(52) U.S. Cl.
CPC .............. *A23L 27/35* (2016.08); *A23L 27/34* (2016.08); *A21D 13/00* (2013.01); *A23G 9/00* (2013.01)

(58) Field of Classification Search
CPC . A23L 2/60; A23L 27/35; A23L 27/34; A23V 2200/132; A23V 2250/5114; A21D 13/00; A23G 9/00
USPC ................................................ 426/548
See application file for complete search history.

(56) References Cited

U.S. PATENT DOCUMENTS

| | | |
|---|---|---|
| 4,514,422 A | 4/1985 | Yang |
| 2002/0192344 A1 | 12/2002 | Brendel |
| 2006/0141103 A1 | 6/2006 | Heritage |
| 2013/0112192 A1 | 5/2013 | Fosdick |
| 2015/0072065 A1 | 3/2015 | Hoffman |
| 2015/0086695 A1* | 3/2015 | Oglesby .................. A23L 27/80 426/548 |
| 2018/0110233 A1 | 4/2018 | Jurgens |

FOREIGN PATENT DOCUMENTS

| | | | |
|---|---|---|---|
| JP | 2011130696 A * | 7/2011 | ............. C12P 19/14 |
| WO | 201204229 W | 1/2012 | |
| WO | 2016171559 A1 | 10/2016 | |

OTHER PUBLICATIONS

Tate & Lyle, Specificaiton Sheet Star-Dri 18 Maltodextrin, Jan. 12, 2018, pp. 1-5 (Year: 2018).*
JP-201130696, Aoyama et al. Jul. 7, 2011, English Machine Translation Abstract, Caims, pp. 1-2 (Year: 2011).*
Anonymous: "Triple Chocolate Ice Cream—No Sugar Added—Slow Churned—Edy's," May 1, 2012 (May 1, 2012), XP055664670, Retrieved from the Internet: URL:https://www.edys.com/products/slow-churned/triple-chocolate-no-sugar-added/slow-churned-no-sugar-added.

* cited by examiner

*Primary Examiner* — Hong T Yoo

(57) ABSTRACT

The invention relates to a glucose(-containing) syrup replacement composition for use in food applications, such as in bakery, beverages, ice cream, confectionery and the like. The glucose(-containing) syrup replacement composition comprises at least 80 wt % of maltodextrin having a dextrose equivalent (DE) of from 15 to 20 and up to 20 wt % of sorbitol and glycerol. The invention also covers the use of the composition in a food product to replace at least partially or completely nutritive mono- and disaccharides having an energy density of 4 kcal/g, preferably to replace at least partially or completely glucose, sucrose and/or fructose, generally in the form of syrups.

18 Claims, No Drawings

COMPOSITION SUITABLE FOR THE REPLACEMENT OF GLUCOSE-SYRUP

CROSS-REFERENCE TO RELATED APPLICATIONS

This application is a national phase application of PCT Application No. PCT/US2020/049515, filed Sep. 4, 2020, which claims the benefit of European Application No. 19196009.5, filed Sep. 6, 2019, and European Application No. 19205249.6, filed Oct. 25, 2019, each of which is incorporated by reference herein in its entirety.

FIELD OF THE INVENTION

The invention relates to a glucose syrup replacement composition for use in food applications, such as in bakery, beverages, ice cream, confectionery and the like.

BACKGROUND

It is well known to utilize glucose syrups in the preparation of various products, such as baked goods. However, in view of the increasing obesity problem, and the rising rate of diabetes, there is a demand for sweetening compositions that can replace glucose syrups. There are a number of polyols, such as maltitol, that can be used in preparing foods, such as baked goods, beverages, ice cream, confectionery and the like.

However, polyols do not sufficiently mimic the properties of glucose syrup in terms of taste, texture, mouthfeel, viscosity, color, transparency etc. Furthermore, certain polyols have a laxative effect if ingested in high amounts.

It has been suggested, such as in WO2016171559A1, to combine a polyol with other bulking agents, such as oligosaccharides, maltodextrins, polydextrose and the like, for reducing the sugar content of a reference food product.

However, although these compositions may be suitable for reducing the sugar content of a food product, they do not satisfactorily replicate and mimic the physical properties, such as viscosity, color, transparency, texture and taste of glucose syrups, which are used in numerous food applications.

Accordingly, it is an object of the invention to provide a composition that would be particularly suitable for use in the preparation of foods and beverages to at least partially substitute glucose(-containing) syrups.

Accordingly, it is also an object of the invention to provide a composition that has similar physical properties (for example, viscosity, transparency and/or color) to glucose(-containing) syrups.

Accordingly, it is also an object of the invention to provide a calorie-reducing composition for use in in the preparation of foods and beverages.

SUMMARY OF THE INVENTION

The invention thus relates to a composition comprising, essentially consisting of or consisting of:
i. at least 80 wt % of maltodextrin having a dextrose equivalence (DE) of from 15 to 20, preferably a DE of from 16 to 18; and
ii. up to 20 wt % of sorbitol and glycerol, preferably at least 0.1 wt % and up to 20 wt % of sorbitol and glycerol, more preferably at least 0.5 wt % and up to 10 wt % of sorbitol and glycerol;

wherein the weight percentages are determined on a dry weight basis.

The composition is suitable for the replacement of glucose(-containing) syrup in a food product. The invention also relates to a food product, such as a bakery product, a beverage, an ice cream, or a confectionery product, comprising the composition according to the invention, wherein said food product preferably does not comprise any glucose(-containing) syrup.

The invention furthermore relates to a process for preparing a composition comprising the steps of:
i. Adding sorbitol and glycerol to maltodextrin having a dextrose equivalence (DE) of from 15 to 20, preferably a DE of from 16 to 18 and;
ii. Mixing and heating the mixture from step (i) to a temperature of from 100-120° C., preferably 102-110° C., more preferably 103-108° C., most preferably 103-105° C.;

to obtain a composition comprising at least 80 wt % of the maltodextrin and at most 20 wt % of both sorbitol and glycerol in total, wherein the weight percentages are determined on a dry weight basis.

The invention also covers the use of the composition according to the invention in a food product, preferably a bakery product, a confectionery product, a beverage or an ice cream. In particular, the composition can be used to replace at least partially or completely nutritive mono- and disaccharides having an energy density of 4 kcal/g, preferably to replace at least partially or completely glucose, sucrose and/or fructose, in a food product. The glucose, sucrose and/or fructose to be replaced is generally in the form of a syrup.

DETAILED DESCRIPTION OF THE INVENTION

The inventors have found that by combining a maltodextrin having a DE of from 15 to 20 with the two humectants, sorbitol and glycerol, a composition can be obtained that can be used to at least partially replace the glucose(-containing) syrups used in many food applications.

1. The Maltodextrin

1.1. Maltodextrin Properties

Any commercially available maltodextrin can be used, which has a DE dextrose equivalence (DE) of from 15 to 20, preferably 16 to 18, more preferably around 17. By maltodextrin it is generally meant herein NOT a resistant maltodextrin.

Preferably, the maltodextrin has a glucose (DP1) content of less than 5 wt %, preferably less then 4 wt %, even more preferably less than 3 wt %, most preferably less than 2 wt %.

Preferably, the maltodextrin has a maltose (DP2) content of less than 12 wt %, preferably less then 10 wt %, even more preferably less than 9 wt %, most preferably less than 8 wt %.

Preferably, the maltodextrin has a maltotriose (DP3) content of less than 16 wt %, preferably less then 15 wt %, even more preferably less than 14 wt %, most preferably less than 13 wt %.

Preferably, the maltodextrin has a DP4+ content of at least 65 wt %, preferably at least 70 wt %, even more preferably at least 75 wt %, most preferably at least 80 wt %. (DP4+ refers to a "degree of polymerization of at least 4 monosaccharides").

The maltodextrin preferably comprises a DP1 content of less than 5 wt %, a DP2 content of less than 12 wt %, a DP3 content of less than 16 wt % and a DP4+ of least 67 wt %. More preferably, the maltodextrin comprises a DP1 content of less than 4 wt %, a DP2 content of less than 10 wt %, a DP3 content of less than 15 wt % and a DP4+ of least 71 wt %. Even more preferably, the maltodextrin comprises a DP1 content of less than 3 wt %, a DP2 content of less than 9 wt %, a DP3 content of less than 14 wt % and a DP4+ of least 75 wt %. Most preferably, the maltodextrin comprises a DP1 content of less than 2 wt %, a DP2 content of less than 8 wt %, a DP3 content of less than 13 wt % and a DP4+ of least 80 wt %.

1.2. Amounts of Maltodextrin in the Composition

The maltodextrin is present in the composition of the invention at an amount of at least 80 wt %. Preferably, the maltodextrin is present in an amount of at least 85 wt %, 90 wt %, 95 wt %, 97 wt % or 98 wt % and/or at an amount of at most 99.9 wt, 99.5 wt %, 99.0 wt %, 98.5 wt % or 98 wt %. The weight percentages are based on the dry weight basis of the composition.

The weight percentages are based on the dry weight basis of the composition.

2. Sorbitol

Sorbitol and glycerol are present in the composition in an amount of up to 20 wt % of the composition based on the dry weight of the composition. For the avoidance of doubt, "up to 20 wt % of sorbitol and glycerol" refers to the total amount of both sorbitol and glycerol in the composition. Preferably the composition comprises at least 0.1 wt % and up to 20 wt % of sorbitol and glycerol, more preferably the composition comprises at least 0.2 wt % and up to 15 wt % of sorbitol and glycerol, yet more preferably the composition comprises at least 0.5 wt % and up to 12 wt % of sorbitol and glycerol, even more preferably the composition comprises at least 1 wt % and up to 10 wt % of sorbitol and glycerol, still more preferably the composition comprises at least 2 wt % and up to 8 wt % of sorbitol and glycerol most preferably the composition comprises at least 2.5 wt % and up to 5 wt % of sorbitol and glycerol.

Preferably, the composition according to the invention comprises up to 15 wt %, 10 wt %, 8 wt % or 5 wt % of sorbitol and/or at least 0.1 wt %, 1 wt %, 2 wt %, 2.5 wt % or 3 wt % of sorbitol. The weight percentages are based on the dry weight basis of the composition.

Any commercially available (food grade) sorbitol can be used.

3. Glycerol

Preferably, the composition according to the invention comprises up to 15 wt %, 10 wt %, 8 wt % or 5 wt % of glycerol and/or at least 0.1 wt %, 1 wt %, 2 wt %, 2.5 wt % or 3 wt % of glycerol. The weight percentages are based on the dry weight basis of the composition.

Any commercially available (food grade) glycerol can be used. Glycerol is also known under the names glycerine, glycerin, propanetriol, 1,2,3-trihydroxypropane or 1,2,3-propanetriol.

4. The Composition According to the Invention

Thus, the composition preferably comprises, essentially consists of, or consists of:
- at least 80 wt %, 85 wt %, 90 wt %, 95 wt %, 97 wt % or 98 wt % of maltodextrin;
- at least 0.1 wt %, 1 wt %, 2 wt % or 3 wt % and up to 10 wt %, 8 wt % or 5 wt % of sorbitol;
- at least 0.1 wt %, 1 wt %, 2 wt % or 3 wt % and up to 10 wt %, 8 wt % or 5 wt % of glycerol;

wherein the weight percentages are based on the dry weight basis of the composition. Any combination of the above amounts are hereby included.

Preferably, the sum of the amounts of maltodextrin, sorbitol and glycerol is 100 wt %, wherein the weight percentages are based on the dry weight basis of the composition.

4.1. Transparency

It has been surprisingly found by the inventors that by gently heating and stirring the mixture of maltodextrin, sorbitol and glycerol in the amounts according to the invention at a temperature of 100 to 120° C., a transparent composition can be obtained.

This transparency is similar to the transparency of glucose (-containing) syrups, making the composition an ideal substitute for glucose(-containing) syrups in many different food applications, such as bakery products, confectionery products, beverages, ice cream and the like.

Furthermore, it has surprisingly been found that the transparency of the composition is stable and maintained over a long period of time.

It was found that the composition can remain transparent for at least 6 months or even at least 9 months or even at least 12 months. This allows the composition to be stored for long periods of time without suffering from changes in its appearance. This makes the use of the composition very versatile.

Transparency can be measured on a spectrophotometer and can be measured as percent transmittance (% T) or as Absorbance (A or Abs.) measured at specific wavelengths, typically at 280 nm. The composition preferably has a percent transmittance of at least 70%, more preferably of at least 75%, even more preferably of at least 80%.

4.2. BRIX

The composition according to the invention preferably has a degrees BRIX of from 50 to 85°, more preferably from 60 to 85°, even more preferably from 70 to 85°, most preferably from 78 to 82°, or alternatively more preferably from 75 to 78° as measured by refractometry. The BRIX can be used to determine the amount (in weight percent) of dry substance of the composition.

The composition according to the invention preferably has a dry substance content of from 50 to 95 wt %, more preferably 60 to 95 wt %, even more preferably 70 to 95 wt %, yet more preferably 75 to 90 wt %, most preferably 75 to 85 wt %.

4.3. Viscosity

The composition according to the invention preferably has
- a viscosity of 30000 to 80000 mPa·s at 30° C., more preferably 40000 to 75000 mPa·s at 30° C., most preferably 50000 to 73000 mPa·s at 30° C., and/or a viscosity of 10000 to 40000 mPa·s at 40° C., more preferably 12000 to 35000 mPa·s at 40° C., most preferably 12000 to 34000 mPa·s at 40° C., and/or a viscosity of 5000 to 15000 mPa·s at 50° C., more preferably 6000 to 12000 mPa·s at 50° C., most preferably 7000 to 12000 mPa·s at 50° C., and/or a viscosity of 2000 to 7000 mPa·s at 60° C., more preferably 2500 to 6000 mPa·s at 60° C., most preferably 2500 to 5500 mPa·s at 60° C.;

as measured according to the Brookfield method, which is well known in the art. A Brookfield Viscometer/Rheometer can be used to measure the viscosity.

4.4. Color

The composition according to the invention preferably has color values of (L*, C* and h*) similar to glucose(-containing) syrups as measured according to the CIE L*C*h color space model on a colorimeter. L* represents darkness/lightness from 0 to 100, C* represents saturation (=chroma) i.e. dullness to brightness from 0 to 1, and h represents the hue angle. The color is measured preferably at time 0 i.e. just after production, once the composition has cooled down to room temperature.

Color can also be measured by the ICUMSA method as provided by ICUMSA GS1/3-7 (2002), ICUMSA GS2/3-10 (2005) and ICUMSA GS2/3-9 (2005). This method measures the color on the ICUMSA color scale, i.e. the yellowness of the sugar. The higher the value, the more yellow the sample.

5. Process for Preparing the Composition

The process for preparing a composition according to the invention comprises the steps of:

i. Adding sorbitol and glycerol to maltodextrin having a dextrose equivalence (DE) of from 15 to 20, preferably a DE of from 16 to 18 and;

ii. Mixing and heating the mixture from step (i) to a temperature of from 100-120° C., preferably 102-110° C., more preferably 103-108° C., most preferably 103-105° C.;

to obtain a composition comprising at least 80 wt % of the maltodextrin and at most 20 wt % of sorbitol and glycerol (i.e. in total, of both sorbitol and glycerol combined), wherein the weight percentages are determined on a dry weight basis The heating temperature is key. The mixture should be heated until the composition reaches a temperature of from 100 to 120° C. Above 120° C., the components will begin to degrade and burn. Under 100° C., the composition does not achieve the right combination of BRIX, color, viscosity and transparency to be suitable for replacing or substituting glucose(-containing) syrups. It has been found that the best combination of these properties is obtained when the mixture is heated to preferably 102-110° C., more preferably 103-108° C., most preferably 103-105° C., whilst mixing.

Mixing is preferably carried out gently with a stirrer in order to avoid the formation of foam.

The heating and mixing is preferably carried out until the desired temperature is achieved and the composition has become transparent with the desired degrees BRIX.

6. Use of the Composition in Food Products

It is further claimed a food product comprising a composition according to the invention and preferably at least one other food ingredient.

The composition according to the invention is suitable for replacing at least partially or completely nutritive mono- and disaccharides having an energy density of 4 kcal/g in a food product. Preferably those mono- and disaccharides are glucose, sucrose, or fructose or a mixture thereof. Often those mono- and disaccharides are in the form a syrup, referred to as glucose syrups, glucose-fructose syrups or fructose-glucose syrups or fructose syrups or high fructose syrups or glucose-containing syrups etc.

More preferably, the composition according to the invention is suitable for replacing at least partially or completely glucose(-containing) syrups in a food product.

By "replacing" it is not meant herein that the glucose(-containing) syrup is physically removed from a food product and substituted with the composition according to the invention. By "replacing" it is meant that the food product according to the invention has less glucose(-containing) syrup than a reference food product comprising a full amount of glucose(-containing) syrup.

Thus, the invention covers a food product comprising the composition according to the invention wherein the food product preferably does not contain any glucose(-containing) syrup or is substantially free of glucose(-containing) syrup.

The food product can be selected from a bakery product, a confectionery product, a beverage or an ice cream, but is not limited to these examples.

A food product will further comprise food ingredients typically used in food, such as one or more of flour, egg or egg substitutes, dairy-based ingredients, baking powder, bicarbonate of soda, yeast, butter, oils, sweeteners, bulking agents, texturizers, flavourings, emulsifiers, stabilizers, preservatives, colouring agents, plant-based proteins, meat-based proteins, dairy-based proteins, egg-based proteins etc.

EXAMPLES OF THE INVENTION

Examples According to the Invention

Sorbitol, glycerol, a liquid maltodextrin having a DE of 17, are first weighed to obtain the relative amounts of each component for the compositions of Examples 1 to 4 as indicated in the table below.

TABLE 1

|  | Maltodextrin (wt %) | Sorbitol (wt %) | Glycerol (wt %) |
| --- | --- | --- | --- |
| Example 1 | 95 | 2.5 | 2.5 |
| Example 2 | 93 | 3.5 | 3.5 |
| Example 3 | 90 | 5 | 5 |
| Example 4 | 80 | 10 | 10 |

Sorbitol and glycerol are added to the liquid maltodextrin. The mixture is heated slowly up to 105° C. while gently stirring. Heating and stirring is stopped once the target Brix of 78-82° is obtained. The composition obtained is a transparent, yellowish blend similar in color and transparency to a glucose syrup having a (dextrose equivalence) D.E. of about 40. These compositions can be used directly in the desired food application to substitute glucose syrups.

The properties of the compositions according to the invention are shown in the table below. These are comparable with a glucose syrup with a 40 DE. The glucose syrup 40 DE in Table 2 below has a dry substance of 80-81 wt %, a glucose content of 14-20 wt %, a DP2 content of 10-16 wt % and a DP3 content of 10-14 wt %, as measured on a dry substance basis.

Particularly, the viscosity at 50° C. of Examples 1 to 4 is similar to the viscosity of the glucose syrup (11430, 9875 and 11380 mPa·s versus 8500 MPa·s). Example 4 shows that a viscosity of even less than the viscosity of the glucose syrup can be achieved.

Thus, the composition according to the invention is a surprisingly good substitute for glucose syrups in various food products. They adequately replicate the texture and appearance of glucose syrups, whilst maintaining a sweet taste.

TABLE 2

|  | Viscosity at 30° C., mPa·s | Viscosity at 40° C., mPa·s | Viscosity at 50° C., mPa·s | Viscosity at 60° C., mPa·s | BRIX/° | percent transmittance % | ICUMSA color unit (IU) |
| --- | --- | --- | --- | --- | --- | --- | --- |
| Example 1 | 72100 | 30450 | 11430 | 5133 | 78.0 | 73.8 | 27.62 |
| Example 2 | 70800 | 34150 | 9875 | 4633 | 77.7 | 73.7 | 31.73 |
| Example 3 | 66100 | 34200 | 11380 | 4220 | 77.9 | 82.6 | 17.02 |
| Example 4 | 33300 | 12530 | 5080 | 2405 | 76.9 | 83.7 | 15.47 |
| Glucose syrup (40 D.E.) | 49500 | 24000 | 8500 | 2500 | 81 | 80 | 20 |

By slightly altering the amounts of maltodextrin, sorbitol and glycerol it is also possible to find the right combination of properties to target the replacement of other glucose syrups, by way of example here a glucose syrup of 40 D.E.

Examples According to the Prior Art

Prior art examples include compositions comprising only maltodextrin and sorbitol or only maltodextrin and glycerol (as for instance in WO2016171559A1).

Comparative examples tested herein are the following:

TABLE 3

|  | Maltodextrin (wt %) | Sorbitol (wt %) | Glycerol (wt %) |
| --- | --- | --- | --- |
| Comparative Example 1 | 99 | 1 | — |
| Comparative Example 2 | 97.5 | 2.5 | — |
| Comparative Example 3 | 95 | 5 | — |
| Comparative Example 4 | 99 | — | 1 |
| Comparative Example 5 | 97.5 | — | 2.5 |

As shown in the table below, these compositions do not provide the right properties to replicate the texture, appearance and taste of glucose syrups. Some of the samples were so thick that viscosity could not even be measured.

TABLE 4

|  | Viscosity at 30° C., mPa·s | Viscosity at 40° C., mPa·s | Viscosity at 50° C., mPa·s | Viscosity at 60° C., mPa·s | BRIX/° |
| --- | --- | --- | --- | --- | --- |
| Comparative Example 1 | N.M.* | 89600 | 34600 | 22400 | 78.2 |
| Comparative Example 2 | 97300 | 41250 | 24450 | 6753 | 78.6 |
| Comparative Example 3 | N.M.* | N.M.* | N.M.* | N.M.* | 78.3 |
| Comparative Example 4 | N.M.* | N.M.* | N.M.* | 94500 | 77.1 |
| Comparative Example 5 | N.M.* | N.M.* | N.M.* | N.M* | 78.0 |
| Glucose syrup (40 D.E.) | 49500 | 24000 | 8500 | 2500 | 81 |

*NM = Not measurable. The composition was too thick to measure viscosity.

The invention claimed is:

1. A composition comprising:
   i. at least 80 wt % of maltodextrin having a dextrose equivalence (DE) of from 15 to 20;
   ii. 0.1 to 5 wt % of sorbitol; and
   iii. 0.1 to 5 wt % of glycerol;
   wherein the weight percentages are determined on a dry weight basis.

2. The composition according to claim 1 wherein the composition has a BRIX of from 50 to 85°.

3. The composition according to claim 1 wherein the composition has a viscosity of 30000 to 80000 mPa·s at 30° C. as measured according to the Brookfield method.

4. The composition according to claim 1 wherein the composition has a viscosity of 10000 to 40000 mPa·s at 40° C. as measured according to the Brookfield method.

5. The composition according to claim 1 wherein the composition has a viscosity of 5000 to 15000 mPa·s at 50° C. as measured according to the Brookfield method.

6. The composition according to claim 1 wherein the composition has a percent transmittance of at least 70%.

7. The composition according to claim 1 suitable for replacing at least partially or completely nutritive mono- and disaccharides having an energy density of 4 kcal/g in a food product.

8. The composition according to claim 7, wherein the mono- and disaccharides are glucose, sucrose, or fructose.

9. A food product comprising the composition according to claim 1 and at least one other food ingredient.

10. The food product according to claim 9, wherein the food product is a bakery product, a confectionery product, a beverage or an ice cream and wherein the food product does not comprise any or is substantially free of glucose-syrup.

11. A process for preparing the composition according to claim 1 comprising the steps of:
   i. adding sorbitol and glycerol to maltodextrin having a dextrose equivalence (DE) of from 15 to 20 and;
   ii. mixing and heating the mixture from step (i) to a temperature of from 100-120° C.;
   to obtain the composition.

12. The process according to claim 11, wherein the maltodextrin has a DE of from 16 to 18, and the temperature for mixing and heating the mixture is from 103-105° C.

13. The process according to claim 11, wherein the mixing and heating step is carried out until the composition becomes transparent and/or has a BRIX of from 75 to 78°.

14. The process according to claim 11 wherein mixing is carried out gently in order to avoid the formation of foam.

15. The process according to claim 11 wherein the mixing and heating step is carried out until the composition becomes transparent and/or has a BRIX of from 50 to 85°.

16. The composition according to claim 1, wherein the maltodextrin has a DE of from 16 to 18.

17. The composition according to claim 1, wherein the composition has a BRIX of from 75 to 78°.

18. The composition according to claim 1, wherein the composition has a percent transmittance of at least 80%.

* * * * *